Aug. 16, 1966     B. H. GOLDNER     3,266,943
INOCULATION OF BIO-ELECTRODES
Filed Oct. 29, 1962
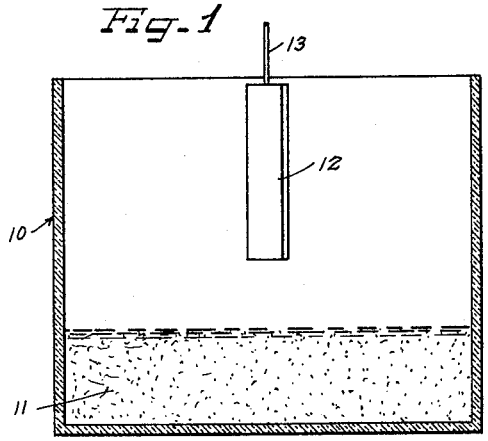
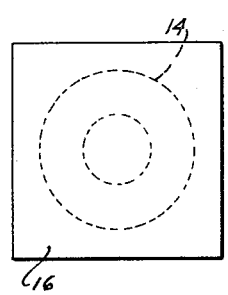
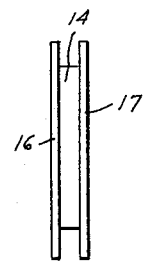
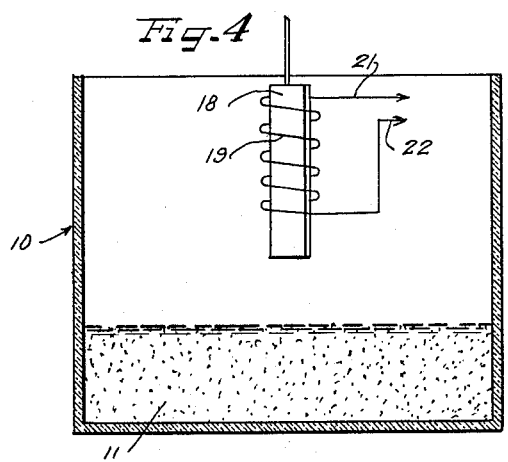
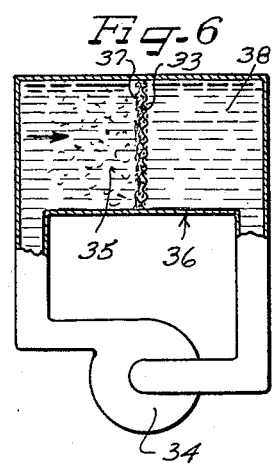
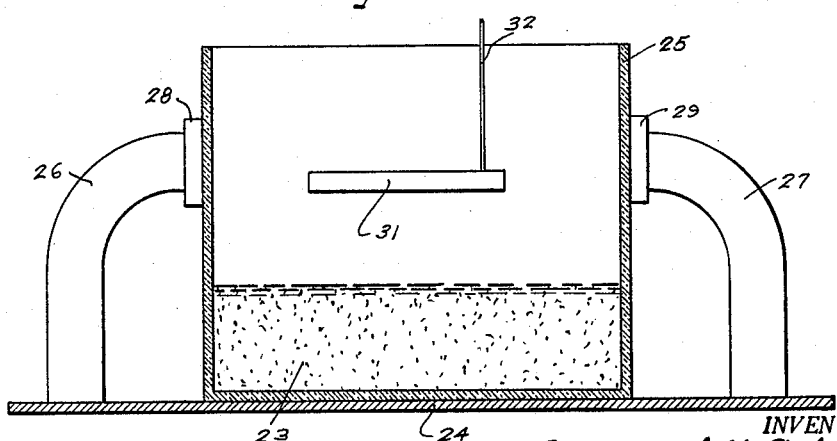
INVENTOR.
Bernard H. Goldner
BY
ATTORNEYS

United States Patent Office 3,266,943
Patented August 16, 1966

3,266,943
INOCULATION OF BIO-ELECTRODES
Bernard H. Goldner, Anaheim, Calif., assignor, by mesne assignments, to TRW Inc., a corporation of Ohio
Filed Oct. 29, 1962, Ser. No. 233,697
7 Claims. (Cl. 136—120)

The present invention relates to improvements in manufacture of bio-electrodes used for electric power generation.

There has now been developed a bio-battery which makes possible the generation of electric power from water environments. These bio-batteries utilize biological materials such as micro-organisms, cell-free extracts of such micro-organisms, or enzymes whether recovered from the micro-organisms, or synthetically prepared. These materials, when placed in intimate contact with an electrode surface can be used to promote or make possible either anodic or cathodic reactions during generation of electric current. The mechanisms by which these materials effectively promote half-cell reaction in their environment may be direct or indirect. For example, certain bacteria have the ability to participate directly in the electrochemical reactions occurring in the cell while others function to produce intermediate compounds which, in turn, participate in the electrochemical reaction.

Some of the materials function by carrying out oxidation-reduction reactions in their life processes which are exothermic. Others function by carrying out oxidation-reduction processes which require photo energy. These processes can be used to promote the cathode reaction in an electrochemical cell, to promote the anode reaction, or, by the selection of different species as the two electrodes, they can be used to promote both reactions simultaneously. In some instances, the use of these materials merely increases the efficiency of the electrochemical cell, and in others, it makes possible the generation of current which would not otherwise occur.

In all systems for the electrochemical generation of power, there are two distinct electrode processes occurring. The first is an anodic process in which a substance is being oxidized and thus gives up electrons to the electrode. The second is a cathodic process in which electrons are being consumed by a substance which is consequently reduced. The general equation representing both of these half-celled processes is given below:

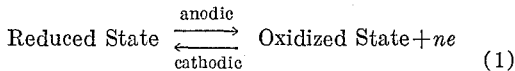

$$\text{Reduced State} \underset{\text{cathodic}}{\overset{\text{anodic}}{\rightleftarrows}} \text{Oxidized State} + ne \quad (1)$$

where "ne" represents a definite number of electrons given off or consumed for each distinct molecular species of the reduced or oxidized state.

The electrode potential for both the anodic and cathodic processes are given by the following equation:

$$E = E^0 + \frac{RT}{nF} \ln\left(\frac{\text{OXID}}{\text{RED}}\right) \quad (2)$$

where $E^0$ is the potential relative to the hydrogen electrode of the electrode reaction; R and F are constants; T is the absolute temperature; $n$ is the number of electrons involved; (OXID) is the product of the concentration of the oxidized substances; and (RED) is the product of the concentration of the reduced substances.

The above equation represents the potential of an electrode which is not supporting a flow of current. When this electrode is coupled to another electrode having a different potential and in the same electrolyte, the subsequent current flow causes the potential of both electrodes to change in a direction approaching each other. This change in electrode potential with current drain is caused primarily by the change in concentration of the reacting substances at the electrode surface. It can be seen from Equation 2 that the electrode functioning as an anode will be consuming the reduced substance so as to decrease the (RED) concentration and will be producing the oxidation substance so as to increase the (OXID) concentration. The opposite condition will exist at the electrode functioning as the cathode. Thus, the anodic electrode charges in a positive direction, or becomes more cathodic, and the cathodic electrode charges in the negative direction, or becomes anodic.

This phenomena of potential change with current drain caused by the depletion or build up of the reaction substances is called polarization. Any system which furnishes the reaction substance that is being consumed at the electrode, whether it is an oxidized or reduced species, or remove the substance which is being produced at that electrode, is called a "depolarizer."

Micro-organisms or enzymes function to influence the reactions occurring at the electrodes. Some of these materials liberate or consume oxygen, sulfate, carbon dioxide, nitrogen compounds, or the like, and all these reactions involve oxidation-reduction systems. Accordingly, different couples of these electrode reactions can be promoted by the proper selection of micro-organisms or enzymes in the vicinity of one or both of the electrodes.

In the past, bio-electrodes have been produced by applying bacteria from a culture medium by agitation of the inoculated medium about the electrode. While eventually this type of procedure produces a satisfactory bio-electrode, the time involved to secure an adequate colony of bacteria on the electrode has been quite long, normally ranging to about seven days.

One of the objects of the present invention is to provide an improved method for inoculating electrodes with bacteria and the like in the formation of bio-electrodes.

A further object of the present invention is to provide a method for the inoculation of electrodes with biological organisms which reduces the time for inoculation very substantially.

Still another object of the present invention is to provide an improved apparatus for inoculating electrodes.

A further object of the invention is to provide an improved bio-electrode structure in which the conditions existing at the surface of the bio-electrode are more conducive to the propagation of biological organisms.

In accordance with the present invention, I inoculate an electrode with organisms capable of promoting a half-cell reaction at the electrode by first establishing a culture medium including the organisms and finely divided dispersed material such as iron powder for a time sufficient to provide a growth of said organisms on the material and thereafter compacting the material and the organisms growing thereon on the surface of the electrode.

The particular application of the improvements of the present invention may take various forms including magnetic attraction of the iron powder to compact the organisms on the electrode, as illustrated in the attached sheet of drawings in which:

FIGURE 1 is a view in elevation of an assembly for inoculating a permanent magnet structure with the organisms;

FIGURE 2 is a view in elevation of an electrode structure which can be substituted for that shown in FIG. 1;

FIGURE 3 is a side elevational view of the magnetic structure shown in FIG. 2;

FIGURE 4 is a view in elevation of a modified form of apparatus employing an electromagnet;

FIGURE 5 is another modified form of apparatus in which the permanent magnets are located outside the inoculation vessel; and FIGURE 6 is a still further modified form illustrating the circulation of the slurry through a porous electrode.

As shown in the drawings:

In FIG. 1, reference numeral 10 indicates generally a vessel for inoculating a metallic electrode which is to form the bio-electrode. Disposed within the vessel 10 is a culture medium 11 containing the particular micro-organisms desired, in combination with finely divided paramagnetic particles. The particularly preferred particles are iron particles but other magnetizable materials such as various ferrous alloys and the like can also be employed. The relative proportions of the culture medium and the iron material are not particularly important to the practice of the present invention as long as enough of the material is present to provide growing sites for the micro-organisms. Generally, the concentration of the iron powder on the order of 1 to 100 grams per liter of the culture medium will be sufficient.

After the micro-organisms have been in contact with the iron powder for time sufficient to permit substantial growth of the bacteria on the finely divided particles, the particles and the bacteria growing thereon are transferred to the electrode. In the form of the invention illustrated in FIG. 1, the electrode takes the form of a permanent magnet 12 suspended by means of a support 13. In this form of the invention, it is merely necessary to dip the magnetic electrode 12 into the culture medium 11 a sufficient number of times to provide for the attraction of a sufficiently large number of the particles having the organisms growing thereon.

It will be recognized that the form of the magnetic electrode may vary substantially. One such variation is illustrated in FIGS. 2 and 3 in which the permanent magnet takes the form of a ring 14 having opposite magnetic polarities at its faces, and being composed of a ceramic magnetic composition. The two opposed magnetic faces are provided with facing plates 16 and 17 of a magnetic material such as iron or steel, and these plates 16 and 17 thereby provide the magnetic surfaces for attracting the inoculated iron particles.

Another means for inoculating an electrode is illustrated in FIG. 4. In this embodiment of the invention, the electrode structure takes the form of a magnetic plate or bar 18 having a coil 19 wound therearound to provide an electromagnet. The two leads of the coil 19, identified at numerals 21 and 22 are then connected to a suitable source of current (not shown). As in the operation of the previously described embodiment, the electrode 18 is at least partially dipped into the culture medium 11 until a desired amount of the surface of the electrode 18 is covered with the combination of organisms and iron material.

In the embodiment illustrated in FIG. 5, there is provided a vessel 25 of a magnetically transparent material such as glass, and a culture medium 23 composed of inoculated magnetic particles. The vessel 25 rests upon a magnetic base such as a steel plate 24. A pair of permanent magnets 26 and 27 having pole faces 28 and 29 respectively are adjustably positionable along the plate 24 and are of different magnetic polarities to provide a strong magnetic field between the pole faces 28 and 29. In this form of the invention, an electrode 31 carried by a support 32 is first dipped into the culture medium 23 and then raised into the magnetic field existing between the pole faces 28 and 29. The presence of the iron particles on the face of the electrode 31 thereby concentrates the magnetic field existing between the pole faces and results in the magnetization of the iron powder and its firm attachment to the surface of the electrode 31.

The need for the magnetic field to attract and hold the iron particles on the electrode is only temporary since the growth of the bacteria will cause the particles to become cemented to the electrode body. The bacteria colony is, in itself, of a cementitious nature.

The present invention is particularly applicable to the inoculation of electrodes with sulfate reducer bacteria of which *Desulfovibrio desulfuricans* is the preferred example. The sulfate reducing bacteria not only participate well in the electrochemical reactions at the cathode but also have an affinity for iron particles. During the life processes of these bacteria, sulfate ions present in the environment are consumed to form sulfide ions which react with the iron to form ferrous sulfide, a very fine substrate for further bacterial growth.

In place of solid magnetized electrodes such as the electrodes 12, 14, 18 or 31 of FIGS. 1 to 5, the electrode body may take the form of a porous conductor 33 shown in FIG. 6. Sintered metals, porous carbon, metal screens, and the like, are useful. The bacteria coated particles can be compacted on such porous conductors by a filtering action shown in FIG. 6. This is most effectively carried out by circulation of the slurry containing the culture and the powder particles through the porous conductor body 33. The bacteria mass soon becomes self-adherent on the porous conductor. As shown in FIG. 6, a pump 34 circulates the slurry 35 through the electrode 33 which is mounted to span a flow passage 36. Circulation is continued until a deposit 37 is compacted on the electrode. When this deposit 37 is of sufficient magnitude to establish the desired colony of micro-organisms the pump 34 may be operated at a low rate to force feed the nutrient culture solution to the deposit while at the same time holding the deposit on the electrode. Usually the solid particles in the slurry are proportioned so that the filtrate on the downstream side of the porous electrode body 33 will be clear when the deposit 37 is of sufficient magnitude to establish the bacteria colony. When the colony grows sufficient to be self-adherent on the electrode body, the bio-electrode is ready for use.

A further description of the present invention will be made in conjunction with the following specific examples.

*Example 1*

A culture medium was made up with the following composition:

| | | |
|---|---|---|
| $NH_4Cl$ | g | 0.4 |
| $KH_2PO_4$ | g | 0.1 |
| Yeast extract | g | 1.0 |
| $MgSO_4 \cdot 7H_2O$ | g | 0.2 |
| Sea water | ml | 1000 |

The phosphate was sterilized separately and added to the medium when cool. About 0.1 gram of ascorbic acid was added to produce reducing conditions.

The culture medium was inoculated with *Desulfovibrio desulfuricans* in a conventional manner and then several grams of iron powder were stirred into the inoculated medium. A growth occurred on the metal particles and a substantial amount of ferrous sulfide was formed. The iron powder was then attracted to the surface of a magnetizable mild steel electrode having an area of 0.022 square feet by attaching a small "Alnico" magnet to one end of the electrode. The field was sufficiently intense to allow total attachment of the iron particles. The electrode was placed in a flask containing 700 ml. hydrogen-grown sulfate reducer culture, and 2200 ml. nutrient sea water. An uninoculated electrode of identical design was placed in the culture to serve as a control. A potentiostat was employed to apply a potential of minus 800 m.v. (with respect to a standard calomel electrode) to the cathodes.

Immediately after application of the voltage to the two electrodes, the current supported by the magnetic bio-cathode was 0.2 amp. per square foot as compared to 0.03 amp. per square foot for the clean electrode. Five days after inoculation, the current supported by the magnetic bio-cathode was 0.68 amp. per square foot as compared to 0.05 amp. per square foot for the control.

*Example 2*

In another test, a mild steel electrode having an area of 0.29 square feet was utilized as the bio-electrode. A quantity of inoculated iron filings sufficient to completely cover the surface of the metal was magnetically attracted to the electrode. Several hours after a potential of —800 m.v. was applied to the cathode, a current density of 0.04 amp. per square foot was produced. A rapid increase of current subsequently occurred, until three days after inoculation, the current density had reached 0.14 amp. per square foot.

*Example 3*

The culture medium of Example 1 was admixed with several grams of iron powder to form a flowable slurry.

A mild steel screen was provided to form the electrode body. The slurry was circulated through the screen by means of a slurry circulating pump until the filtrates was relatively free of iron particles. Pressure was then maintained on the upstream face of the screen to force feed the filtrate liquid through the screen for holding the bacteria on the screen while feeding the bacteria with nutrient in the filtrate. When sufficient bacteria growth was established to render the particles self-adherent on the screen, the electrode was ready for use in a battery. The gelatinous cementitious nature of the bacteria colony is sufficient to maintain the colony on the electrode base.

It will be evident that various modifications can be made to the described embodiments without departing from the scope of the present invention.

I claim as my invention:

1. The method of inoculating a metal electrode with organisms capable of promoting a half-cell reaction at said electrode which comprises establishing a culture medium including said organisms and finely divided water insoluble material for a time sufficient to provide a growth of said organisms on said material, and thereafter compacting the organism coated material on the surface of said electrode to produce an adherent coating thereon.

2. The method of inoculating a metal electrode with organisms capable of promoting a half-cell reaction at said electrode which comprises establishing a culture medium including said organisms and iron powder for a time sufficient to provide a growth of said organisms on said iron powder, and thereafter depositing said iron powder on the surface of said electrode to produce an adherent coating thereon.

3. The method of inoculating a metal electrode with sulfate reducing organisms which comprises establishing a culture medium including said organisms and finely divided iron powder for a time sufficient to provide a growth of said organisms on said powder, and thereafter depositing the organism coated powder on the surface of said electrode to produce an adherent coating thereon.

4. The method of inoculating a metal electrode with sulfate reducing organisms which comprises establishing a culture medium including said organisms and finely divided iron powder for a time sufficient to provide a growth of said organisms on said iron powder, and thereafter magnetically attracting said iron powder to the surface of said electrode to produce an adherent coating thereon.

5. The method of inoculating a porous metal electrode with organisms capable of promoting a half-cell reaction at said electrode which comprises establishing a culture medium including said organisms and a finely divided electrically conductive material for a time sufficient to provide a growth of said organisms on said material, and forcing the culture through the pores of said electrode to deposit the organism coated conductive material in said electrode.

6. The method of making a bio-electrode which comprises forming a flowable culture medium containing organisms capable of promoting a half-cell reaction and finely divided iron powder, admixing the powder and culture media for a sufficient time to establish a growth of the organisms on the iron powder particles, forcibly depositing the bacteria coated iron particles on an electrode body composed of electrically conductive material, feeding culture medium to the deposited bacteria coated particles until a self-adherent colony of bacteria is built up on the body, and releasing the holding force on the thus coated body.

7. The method of inoculating a metal electrode with organisms capable of promoting a half-cell reaction at said electrode which comprises establishing a culture medium including said organisms and finely divided magnetic material for a time sufficient to provide a growth of said organisms on said magnetic material, and inserting an electromagnetic electrode into said medium, and energising said electromagnetic electrode to provide a magnetic field at said electrode sufficient to attract the magnetic material and the organisms growing thereon to said electrode.

References Cited by the Examiner

UNITED STATES PATENTS

| | | | |
|---|---|---|---|
| 2,125,846 | 8/1938 | Laughlin | 210—223 |
| 2,142,737 | 1/1939 | Schaff | 210—193 |
| 2,383,066 | 8/1945 | McDermott | 210—193 X |
| 2,490,635 | 12/1949 | Kisch | 210—223 |
| 2,596,392 | 5/1950 | Fessler | 210—193 |
| 2,895,851 | 7/1959 | Johnson | 117—93 |
| 2,976,174 | 3/1961 | Howard | 117—93 |
| 3,020,327 | 2/1962 | Ruetschi | 136—120 |
| 3,092,516 | 6/1963 | Rightmire | 136—86 |
| 3,097,974 | 7/1963 | McEvoy et al. | 136—120 |
| 3,101,285 | 8/1963 | Tantram et al. | 136—120 |

OTHER REFERENCES

Bergy's Manual of Determinative Bacteriology, Seventh edition, Williams & Wilkins, 1957, page 249.

Electricity From the Septic Tank, Martin Mann, Popular Science, January 1962, page 29.

WINSTON A. DOUGLAS, *Primary Examiner.*

JOHN H. MACK, *Examiner.*

W. VAN SISE, A. SKAPARS, *Assistant Examiners.*